(12) United States Patent
Tsuchida

(10) Patent No.: US 7,611,297 B2
(45) Date of Patent: Nov. 3, 2009

(54) IMAGING DEVICE

(75) Inventor: Masaaki Tsuchida, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 318 days.

(21) Appl. No.: 11/513,668

(22) Filed: Aug. 30, 2006

(65) Prior Publication Data

US 2007/0139535 A1 Jun. 21, 2007

(30) Foreign Application Priority Data

Sep. 8, 2005 (JP) .............................. 2005-260634

(51) Int. Cl.
*G03B 17/00* (2006.01)
*H04N 5/76* (2006.01)
*H04N 5/225* (2006.01)
(52) U.S. Cl. ...................... 396/529; 348/231.6; 348/360
(58) Field of Classification Search ............ 348/231.99, 348/72–76, 231.7, 211.99, 211.4, 211.6, 348/231.3, 231.6, 360; 396/529
See application file for complete search history.

(56) References Cited

U.S. PATENT DOCUMENTS

| | | | |
|---|---|---|---|
| 6,731,305 B1 * | 5/2004 | Park et al. .................... | 345/629 |
| 2002/0196197 A1 * | 12/2002 | Watanabe .................... | 345/1.1 |
| 2004/0201743 A1 * | 10/2004 | Amling et al. ........... | 348/231.6 |

FOREIGN PATENT DOCUMENTS

JP       2003-098585       4/2003

* cited by examiner

*Primary Examiner*—W B Perkey
*Assistant Examiner*—Minh Q Phan
(74) *Attorney, Agent, or Firm*—Cohen Pontani Lieberman & Pavane LLP (57) ABSTRACT

An imaging device wherein a camera module is controlled based on a personality file for module (individual control data) which is retrieved from a camera module and is peculiar to the camera module and on a personality file for sensor (type-dependent control data) relating to the type of the camera module stored in a memory section (second memory) in advance.

6 Claims, 6 Drawing Sheets

PERSONALITY FILE FOR MODULE
{
  APERTURE VALUE: F2.8
  FOCAL LENGTH: 4.5mm
},{
  DEFECTIVE PICTURE-ELEMENT ADDRESS
  [0x2001, 0x30AE,···]
},{
  MINIMUM FOCUS DISTANCE: 0.45m
  FOCUS STEP NUMBER: 5
}

FIG. 5(b)

PERSONALITY FILE FOR SENSOR
{
  COLOR GAIN R: 1.0
  COLOR GAIN B: 1.6
  COLOR GAIN G: 1.3
},{
  GAIN Max: 16
  GAIN Min: 1
}

FIG. 5(c)

PERSONALITY FILE FOR CONTROL
{
  COLOR GAIN R: 1.0
  COLOR GAIN B: 1.6
  COLOR GAIN G: 1.3
},{
  GAIN Max: 16
  GAIN Min: 1
},{
  APERTURE VALUE: F2.8
  FOCAL LENGTH: 4.5mm
},{
  DEFECTIVE PICTURE-ELEMENT ADDRESS
  [0x2001, 0x30AE,···]
},{
  MINIMUM FOCUS DISTANCE: 0.45m
  FOCUS STEP NUMBER: 5
}

FIG. 6(a)

PERSONALITY FILE FOR MODULE

```
...
{
a1=1.11
a2=0.69
a3=0.05
r_coff=1.20
g_coff=1.0
b_coff=1.11
vign_center_x=0.5
vign_center_y=0.5
}
...
```

FIG. 6(b)

PERSONALITY FILE FOR SENSOR

```
...
{
a1=1.09
a2=0.69
a3=0.03
r_coff=1.20
g_coff=1.0
b_coff=1.02
vign_center_x=0.5
vign_center_y=0.5
}
...
```

FIG. 6(c)

PERSONALITY FILE FOR CONTROL

```
...
{
a1=1.11
a2=0.69
a3=0.05
r_coff=1.20
g_coff=1.0
b_coff=1.11
vign_center_x=0.5
vign_center_y=0.5
}
...
```

IMAGING DEVICE

This application is based on Japanese Patent Application No. 2005-260634 filed on Sep. 8, 2005 in Japanese Patent Office, the entire content of which is hereby incorporated by reference.

BACKGROUND OF THE INVENTION

The present invention relates to an imaging device including a main unit and a camera module that is connected to the main unit.

There has been proposed an image data processing apparatus wherein a camera module is added to an information terminal such as a cell-phone in recent years, and it has come into wide use with its evaluated merit that an image can be taken simply at any time. Further, standardization of a connection method between a camera module and a main unit is in progress now (for example, SMIA: Standard Mobile Imaging Architecture and others), and in the present structure, a camera module and a main unit both conforming to standards can be replaced each other.

There is further proposed a camera module which outputs image data obtained through imaging to a main unit under the condition that the image data are raw data which have not been subjected to image processing. In the case of this structure, a main unit in a subsequent stage conducts image processing for inputted raw data based on lens characteristics and on a defective picture-element position of an imaging element in the camera module. Therefore, control data corresponding to types of camera module are stored on the main unit side in advance, and prescribed image processing is conducted on inputted raw data, based on these control data, in this structure. There has been proposed a lens-body all-in-one type camera wherein initial value data measured and adjusted in the assembly stage of an imaging unit are stored in a memory provided in an imaging unit (for example, see Patent Document 1).

Generally, even in the case of camera modules of the same model, lens characteristics and a position of a defective picture-element of an imaging element are different from each other, because each camera module has an individual difference in physical characteristics and electrical characteristics of each part constituting the camera module.

However, in the structure to store control data corresponding to camera module types on the main unit side in advance, there is a problem that it is impossible to control optimally for an individual of camera modules.

In addition, a technology disclosed in Patent Document 1 is one relating to a lens-body all-in-one type camera wherein an imaging unit and a camera body are inseparable from each other because of the structure in which even characteristic data of the camera body (main unit) are stored in a memory device of an imaging unit, thus, this technology cannot be applied to an imaging device composed of a main unit and of a camera module which can be installed on and removed from the main unit.

(Patent Document 1) Unexamined Japanese Patent Application Publication No. 2003-98585

SUMMARY

An object of the invention is to provide an imaging device capable of controlling optimally for each individual of camera modules.

To attain the object mentioned above, an embodiment of the invention is an imaging device including a main unit and a camera module that is connected to the main unit, wherein the camera module is equipped with an imaging member that captures images of a photographic subject as image data, a data communication device for transmitting and receiving data between the camera module and the main unit and the first memory that stores individual control data peculiar to the camera module in advance. The main unit is equipped with the second memory that stores type-dependent control data relating to a type of the camera module in advance, an retrieving device that retrieves the individual control data from the first memory through the data communication device and a control device that controls the camera module based on individual control data retrieved by the retrieving device and on type-dependent control data stored in the second memory.

Further, an embodiment of the invention is represented by the aforesaid embodiment wherein the camera module is further equipped with the third memory for storing identification information for identifying a type of the camera module, and the main unit is equipped with a identification information retrieving device that retrieves the identification information from the third memory through the data communication device and a specifying device that specifies type-dependent control data corresponding to the identification information from plural type-dependent control data stored in the second memory based on the retrieved identification information.

Still further, an embodiment of the invention is represented by the aforesaid embodiment wherein the control device stated above merges the individual control data and the type-dependent control data.

Furthermore, an embodiment of the invention is represented by the aforesaid embodiment wherein the image data are raw data.

BRIEF DESCRIPTION OF THE DRAWINGS

FIG. 5(*a*) is a diagram showing an example of setting items included in a personality file for a module, FIG. 5(*b*) is a diagram showing an example of setting items included in a personality file for a sensor and FIG. 5(*c*) is a diagram showing an example of setting items included in a personality file for control.

FIG. 6(*a*) is a diagram showing an example of setting items included in a personality file for a module, FIG. 6(*b*) is a diagram showing an example of setting items included in a personality file for a sensor and FIG. 6(*c*) is a diagram showing an example of setting items included in a personality file for control.

DETAILED DESCRIPTION OF THE PREFERRED EMBODIMENT

Examples wherein an imaging device of the invention is applied to cell-phone 10 with camera-function will be explained in detail as follows, referring to FIGS. 1-6. Meanwhile, in the present embodiment, camera module 20 which will be explained later corresponds to a camera module, and cell-phone 10 (excluding camera module 20) corresponds to a main unit.

Figure 1:
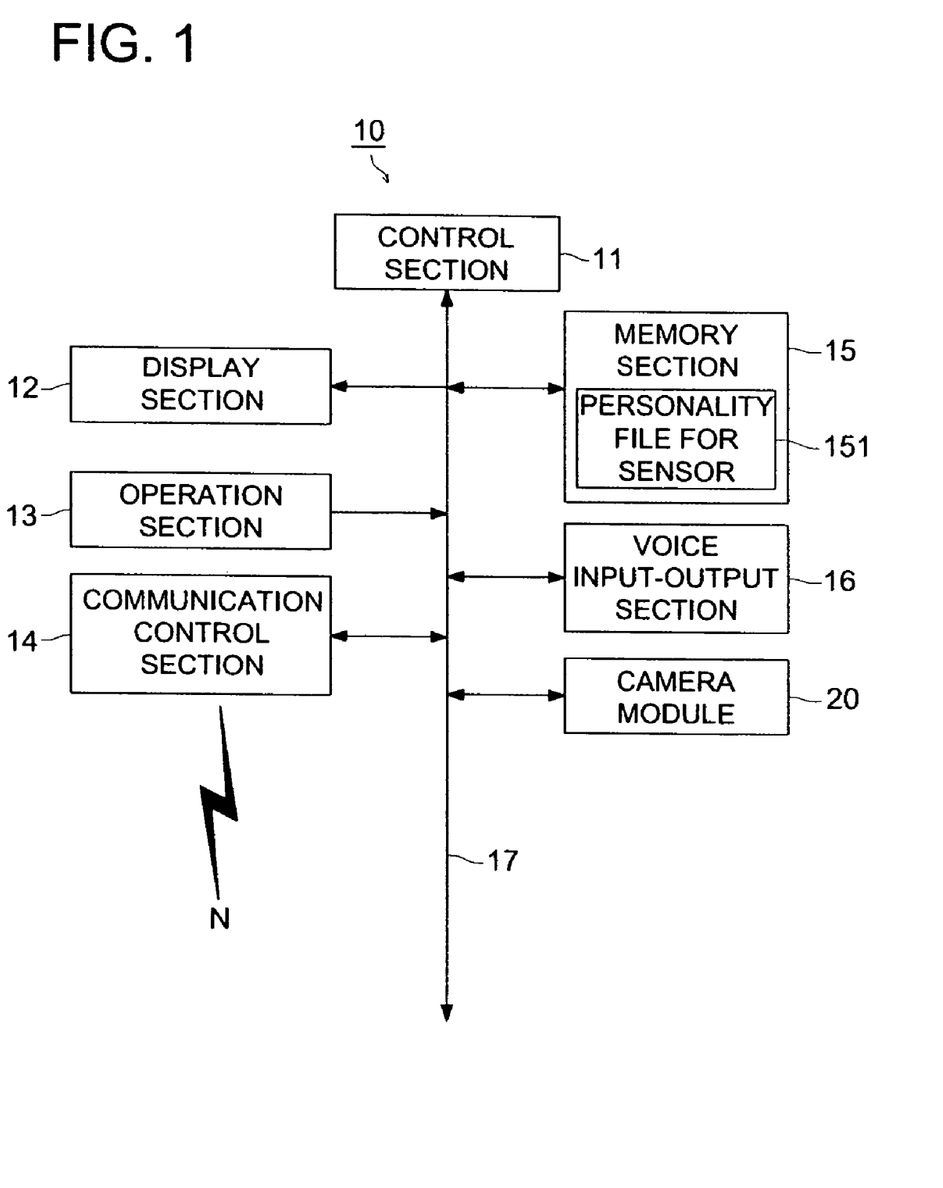
FIG. 1 is a block diagram showing schematically the functional structure of a cell-phone.

FIG. 1 shows a functional structure of cell-phone 10. As shown in FIG. 1, the cell-phone 10 is composed of control section 11, display section 12, operation section 13, communication control section 14, memory section 15, voice input-output section 16 and camera module 20, and respective sections are connected by bus 17.

The control section 11 gives instructions to respective sections constituting cell-phone 10 and conducts input and output of data between respective functional sections, and is composed of CPU (Central Processing Unit), ROM (Read Only Memory) and RAM (Random Access Memory). More specifically, the control section 11 reads out system programs stored in ROM and/or memory section 15, and develops them on a work memory formed in RAM to control each section following the system program. Further, the control section 11 reads out application programs such as various types of processing programs stored in ROM and/or memory section 15, then, develops them on a work memory to practice various types of processing, and stores the results of the processing in work memory in RAM and causes display section 12 to display. Then, the control section 11 causes the memory section 15 to store the results of the processing stored in a work memory.

In addition, the control section 11 starts camera module 20 and stops it by controlling electric power supplied to camera module 20 from a power section (not illustrated), based on manual switch signals instructing ON or OFF for camera module 20 inputted from operation section 13.

Further, the control section 11 specifies a type (model) of camera module 20, by reading sensor ID 221 (see FIG. 2) stored in imaging element 22 of camera module 20 connected to the present cell-phone 10, and thereby, reads a corresponding personality file for sensor from memory section 15. The sensor ID in this case means identification information stored in advance for identifying a type of camera module 20 such as a serial number, and it is assumed to be information capable of specifying a type of camera module 20.

Further, the control section 11 retrieves personality file for module 261 (see FIG. 2) from nonvolatile memory 26 of after-mentioned camera module 20 connected to the present cell-phone 10, and stores it in a work memory in RAM. Then, the control section 11 generates a personality file for control by merging personality file for module 261 stored in the work memory and personality file for sensor 151, and stores it in memory section 15. Then, camera module 20 is controlled by the control section 11 based on this personality file for control.

After raw data (image) are inputted from camera module 20, the control section 11 further conducts image processing such as shading correction, defective picture-element correction and gamma correction on the raw data based on the after-mentioned personality file for control.

Display section 12 is composed of a display control circuit (not shown) and LCD (Liquid Crystal Display) panel (not shown), and conducts image display based on display data inputted from the control section 11. Incidentally, it is assumed that raw data after image processing which are inputted from the control section 11 are displayed on display section 12 after being converted by display control circuit into data format which can be displayed.

Operation section 13 has therein a cursor key, a character-numeric key and various functional keys, and manual switch signals generated through its key operation are outputted to the control section 11.

Communication control section 14 is composed of a wireless communication section including an unillustrated antenna, and it conducts transmitting and receiving of a variety of information with each equipment on communication network N connected through a radio base station, following instructions inputted from the control section 11.

Memory section 15 is composed of a nonvolatile memory such as a flash memory, and it stores a system program corresponding to cell-phone 10, various type of processing programs workable on the system program, an application program and data processed by the aforesaid programs.

The memory section 15 stores in advance plural personality files for sensor 151 prepared for each type of camera module 20. The personality file for sensor 151 in this case means a data file on which common control data are recorded for each type of camera module, and a preset value for controlling a camera module is recorded thereon. Based on sensor ID of camera module 20 connected to cell-phone 10, the control section 11 specifies a personality file for sensor corresponding to a type of camera module 20, from a plurality of personal files for sensor stored in memory section 15, and reads out this specified personality file for sensor.

Having a microphone, a speaker, an amplifier, an A/D converting section and a D/A converting section, voice input-output section 16 converts voice signals of a user inputted from a microphone into digital voice information, and outputs the voice information to the control section 11. The voice input-output section 16 converts voice information inputted from control section 11 in the course of receiving and voice information such as a ringtone, an operation confirmation sound into analogue voice signals, and amplifies them to output from a speaker.

Next, camera module 20 will be explained, referring to FIG. 2.

Figure 2:
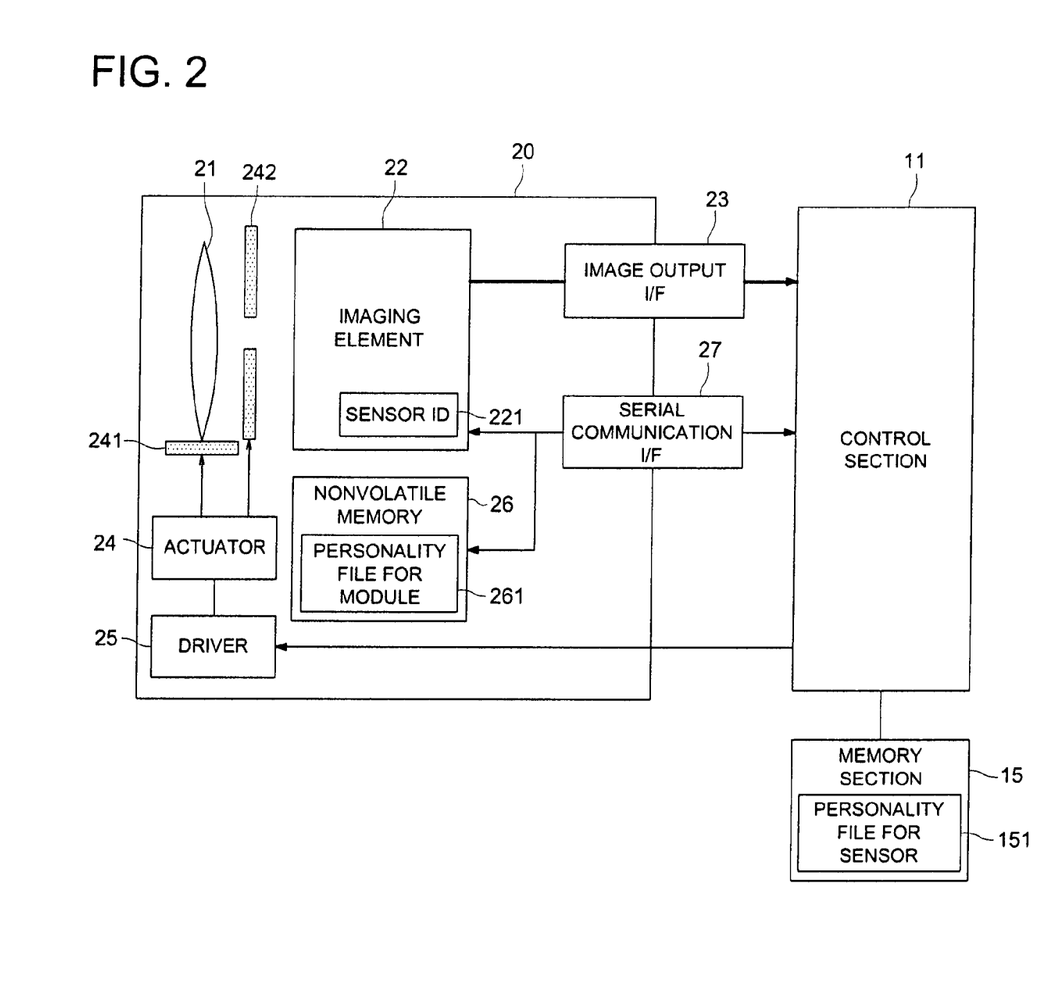
FIG. 2 is a block diagram showing schematically the functional structure of a camera module.

As shown in FIG. 2, the camera module 20 is composed of imaging optical system 21, imaging element 22, image output I/F 23, actuator 24, driver 25, nonvolatile memory 26 and serial communication I/F 27.

The imaging optical system 21 is an optical lens made of glass or plastic, and on its optical path, an optical image of a photographic subject is formed on imaging element 22.

The imaging element 22 is an imaging element such as CMOS (Complementary Metal Oxide Semiconductor) and CCD (Charge Coupled Device), and it generates image data by converting an image of the photographic subject formed by the imaging optical system 21 on a light-receiving surface into electric signals, and outputs the image data to image output I/F 23 under the condition of raw data. Further, a gain value, an image size and a frame rate of the imaging element 22 are changed by register control conducted from the control section 11 through serial communication I/F 27.

Further, in the imaging element 22, sensor ID 221 for identifying a type (model) of camera module 20 is stored on the register, and a type of the present camera module 20 is specified when this sensor ID is read by control section 11 through serial communication I/F 27. Incidentally, in the present embodiment, though the serial number of the imaging element 22 serves as identification information for camera module 20, the identification information is not limited to the serial number, and it can be anything if it is information capable of identifying a type of camera module 20. Further, although identification information is stored in the imaging element 22 in the present embodiment, the identification information can be also stored in nonvolatile memory 26, for example, without being limited to the foregoing.

Image output I/F 23 is a high speed serial interface such as CCP2 (Compact Camera Port 2: Registered Trademark) and a parallel interface, and it transmits image data inputted from the imaging element 22 to control section 11 of cell-phone 10.

A stepping motor and a piezoelectric element are used as actuator 24 which moves imaging optical system 21 and changes a focal length by driving conveyance section 241 in accordance with drive signals inputted from driver 25. The actuator 24 changes aperture value of imaging optical system 21, by opening and closing aperture section 242 in accordance with drive signals inputted from driver 25.

Driver 25 generates drive signals for driving actuator 24 in compliance with control from control section 11. Incidentally, in the present embodiment, though an unillustrated interface capable of controlling driver 25 directly from control section 11 is to be provided, the structure can be also employed wherein actuator 24 can be controlled from control section 11 through after-mentioned serial communication I/F 27, without being limited to the foregoing.

Nonvolatile memory 26 is a rewritable storage medium such as an EEPROM (Electrically Erasable Programmable Read-Only Memory) and a flash memory, and personality file for module 261 that is peculiar to camera module 20 is stored in the nonvolatile memory 26 in advance. The personality file for module 261 in this case is a data file wherein control data peculiar to each of camera module 20 measured and adjusted in the manufacturing stage for camera module 20 are recorded, and preset values for controlling a camera module or the like are recorded therein.

Serial communication I/F 27 is a serial interface such as I2C (Registered Trademark), and data such as control signals are transmitted and received between itself and control section 11.

Next, operations of the present embodiment will be explained as follows, referring to a flow chart in FIG. 3.

Figure 3:
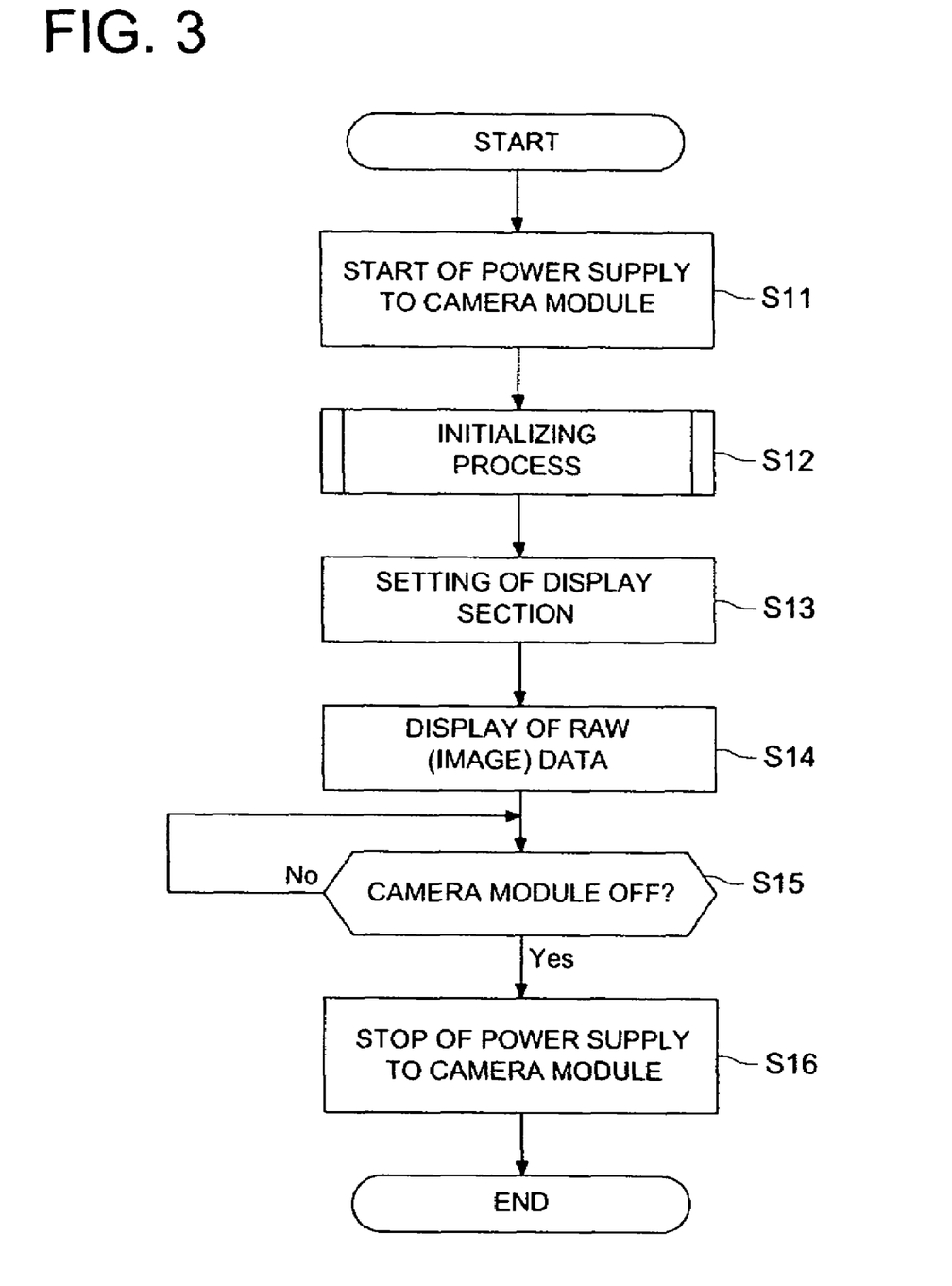
FIG. 3 is a flow chart showing procedures of start-up processing of a camera module.

FIG. 3 is a flow chart showing a flow of camera module starting processing in cell-phone 10. Incidentally, the starting processing of the present camera module is represented by the processing practiced by software processing in cooperation between control section 11 and control program stored in an unillustrated ROM and/or memory section 15.

When the manual switch signals which turn camera module 20 on are inputted through operation section 13, electric power is supplied to camera module 20 (step S11) and initializing process for camera module 20 is conducted (step S12).

Figure 4:
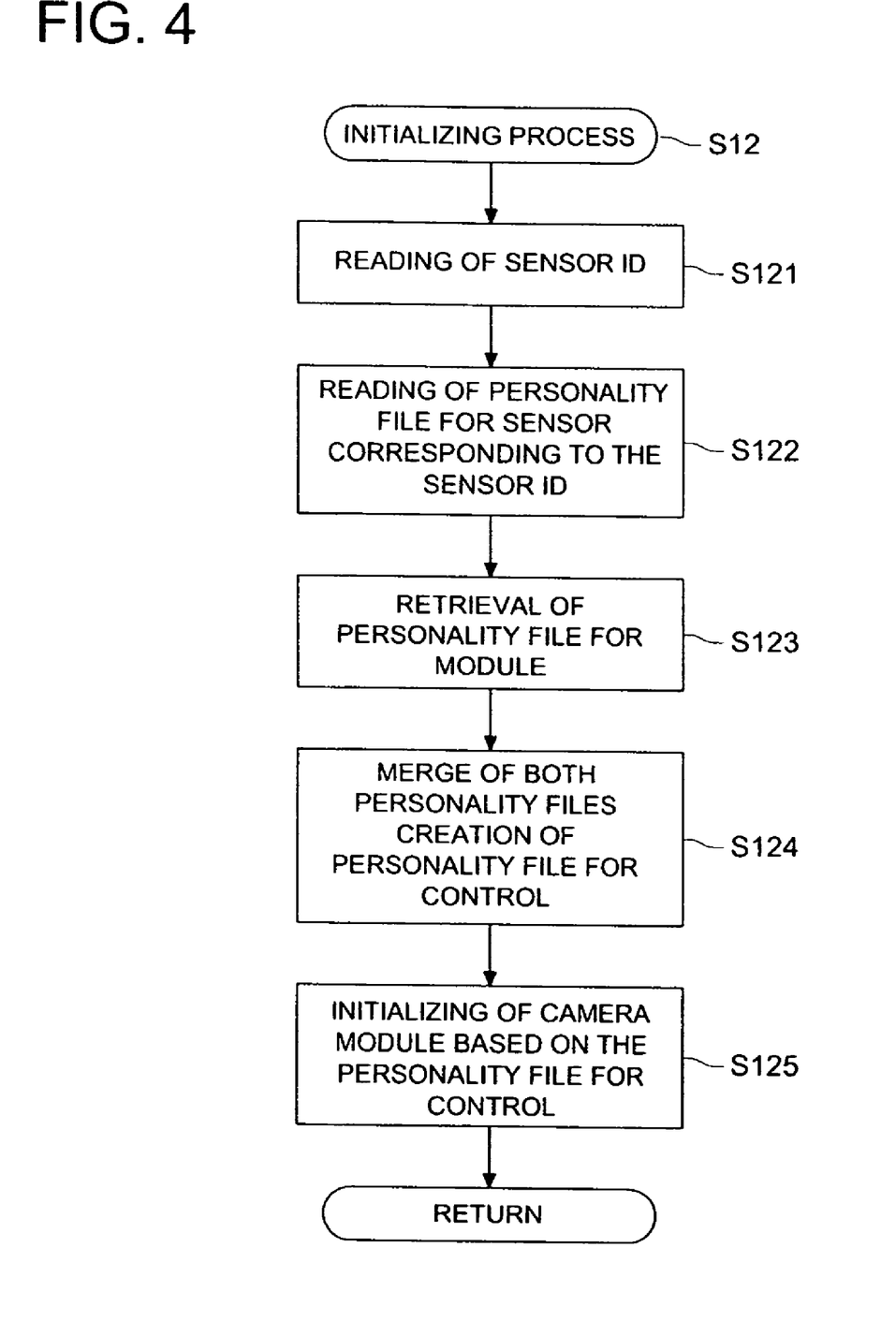
FIG. 4 is a flow chart showing procedures of initializing process.

Initializing process for step S12 will be explained as follows, referring to FIG. 4.

Figure 5:
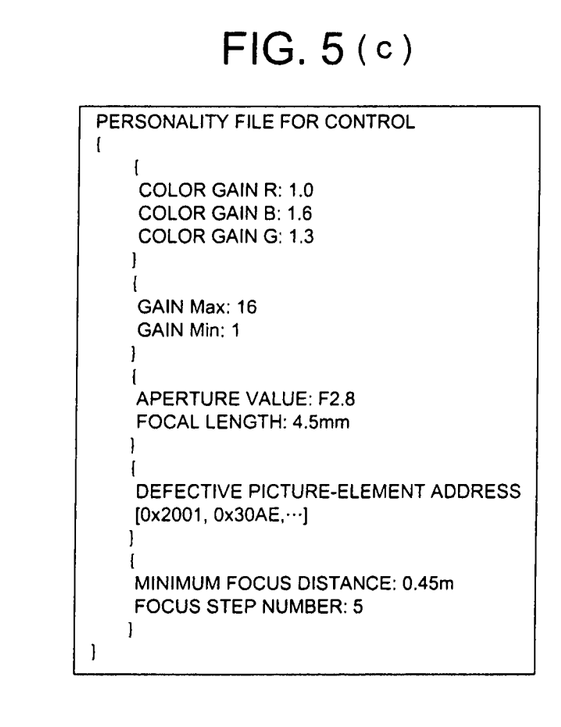

As shown in FIGS. 5(*a*) and 5(*b*), when there are no identical items in the setting items included in both personality files, mergence is conducted to cover the setting items of both personality files in the processing for generating a personality file for control in step S15, thus, the personality file for control shown in FIG. 5(*c*) is generated.

By generating a personality file for control in which the setting items of both personality files are covered, as stated above, the control based on personality file for module 261 and on personality file for sensor 151 is made possible, whereby, each of camera modules 20 can be controlled optimally.

Figure 6A:
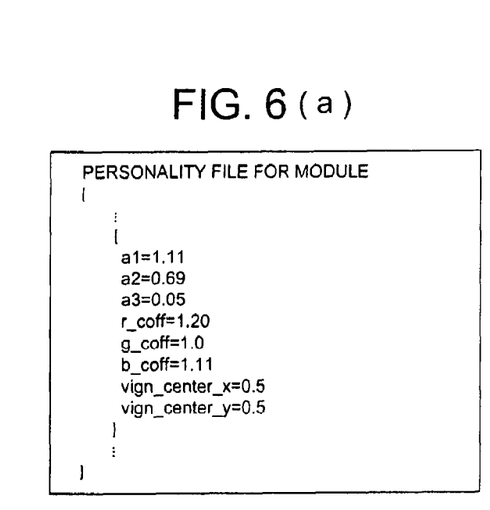
Figure 6B:
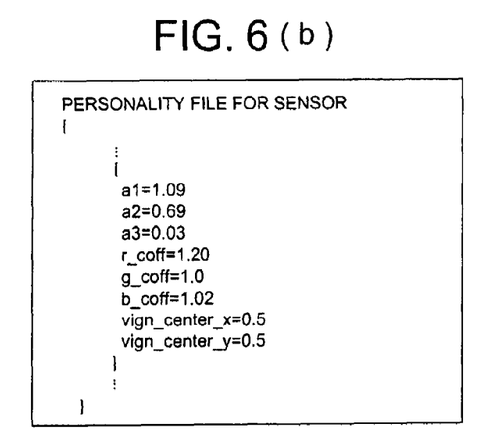

FIG. 6(*a*) shows an example of personality file for module 261 stored in nonvolatile memory 26, in which preset values relating to shading correction of camera module 20 are recorded. FIG. 6(*b*) shows an example of personality file for sensor 151 stored in memory section 15, in which preset values relating to shading correction of camera module 20 are recorded.

Figure 6C:
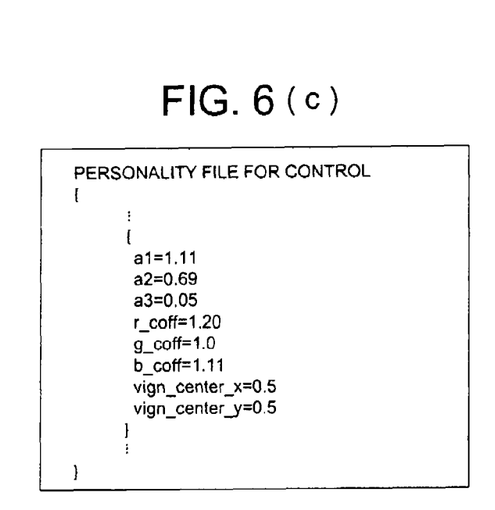

As shown in FIGS. 6(*a*) and 6(*b*), when there are identical items in the setting items included in both personality files, mergence in which the preset values included in a personality file for module have priority is conducted in the processing for generating a personality file for control in step S15, thus, the personality file for control shown in FIG. 6(*c*) is generated.

By generating a personality file for control by giving priority to preset values included in a personality file for module, the control based on control data peculiar to camera module 20 is made possible, whereby, each of camera modules 20 can be controlled optimally.

Returning to FIG. 4, by initializing camera module 20 based on a personality file for control generated in step S15, preset values relating to respective sections of camera module 20 are changed to become preset values recorded on the personality file for control (step S125), and after that, the step moves to step S13 in FIG. 3.

Next, after setting for displaying raw data inputted from camera module 20 is made on display section 12 (step S13), and after image processing such as shading correction, defective picture-element correction or gamma correction based on respective preset values included in a personality file for control is conducted on raw data inputted from camera module 20, data after this image processing are displayed on display section 12 (step S14).

Successively, there is judged whether manual switch signals to turn camera module 20 off have been inputted through operation section 13 or not (step S15). Incidentally, during the period before manual switch signals to turn off are inputted, in this case, a processing relating to photographing of photographic subject such as imaging may be carried out based on manual switch signals through operation section 13, or it may not be carried out.

When manual switch signals to turn camera module 20 off are judged to have been inputted in step S15 (step S15; Yes), power supply to camera module 20 is stopped (step S16), and the present processing is terminated.

In the present embodiment, camera module 20 is controlled based on personality file for module 261 (individual control data) peculiar to a camera module and on personality file for sensor 151 (type-dependent control data) relating to a type of a camera module, therefore, each of camera modules 20 can be controlled optimally.

A description in the present embodiment is one showing an example of an image data processing apparatus relating to the invention and the invention is not limited to the description. Detailed structure and detailed operations of cell-phone 10 in the present embodiment can be modified properly without departing from the spirit and scope of the invention.

For example, though the explanation has been given by using cell-phone 10 as an imaging device equipped with an imaging device of the invention, PDA equipped with a digital camera or a camera function can also be used without being limited to the foregoing.

Further, in the present embodiment, personality file for module 261 and personality file for sensor 151 are merged. However, camera module 20 can also be controlled under the condition of individual storage, without being limited to the foregoing. in the embodiment of the invention, each of camera modules can be controlled optimally based on individual control data and type-dependent control data.

In the embodiment of the invention, type-dependent control data corresponding to identification information of camera module can be specified from a plurality of type-dependent control data stored in the second memory section.

In the embodiment of the invention, individual control data and type-dependent control data can be merged.

In the embodiment of the invention, raw data can be used for image data.

What is claimed is:

1. An imaging device, comprising:
an individual camera module including:
an imaging member for capturing a subject image as image data;
a data communication device; and
a first memory storing individual control data which is peculiar to the individual camera module in advance, and
a main unit connected with the individual camera module, the main unit comprising:
a second memory storing type-dependent control data common to all camera modules of a type of the individual camera module in advance;
a retrieving device for retrieving the individual control data from the first memory, the data communication device being configured for transmitting and receiving data between the first memory and the retrieving device; and
a control device configured for controlling the individual camera module based on the individual control data retrieved by the retrieving device from the first memory through the data communication device and the type-dependent control data stored in the second memory,
wherein the control device merges the individual control data and the type-dependent control data, and
wherein when an identical item is present in both the individual control data and the type-dependent control data, the item in the individual control data has priority when the individual control data and type-dependent control data are merged.

2. The imaging device of claim 1, wherein the individual camera module further comprises a third memory for storing identification information to identify a type of the individual camera module, and wherein the main unit further comprises an identification information retrieving device for retrieving the identification information from the third memory through the data communication device; and a specifying device for specifying type-dependent control data corresponding to the retrieved identification information from among a plurality of sets of the type-dependent control data stored in the second memory based on the identification information.

3. The imaging device of claim 1, wherein the image data are raw data.

4. The imaging device of claim 1, wherein the individual control data reflects a difference between the individual camera module and other camera modules of the same type as the individual camera module.

5. The imaging device of claim 1, wherein the individual control data reflects a manufacturing variation among different camera modules of the same type as the individual camera module.

6. The imaging device of claim 1, wherein the individual control data shows lens characteristics or a defective picture element position of an imaging element in the individual camera module.

* * * * *

UNITED STATES PATENT AND TRADEMARK OFFICE
CERTIFICATE OF CORRECTION

| | | |
|---|---|---|
| PATENT NO. | : 7,611,297 B2 | Page 1 of 1 |
| APPLICATION NO. | : 11/513668 | |
| DATED | : November 3, 2009 | |
| INVENTOR(S) | : Masaaki Tsuchida | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this

Twelfth Day of October, 2010

David J. Kappos
*Director of the United States Patent and Trademark Office*